US007844423B2

(12) United States Patent
Chandrashekar et al.

(10) Patent No.: US 7,844,423 B2
(45) Date of Patent: Nov. 30, 2010

(54) COMPONENT-BASED MODELING OF WIRELESS MAC PROTOCOLS FOR EFFICIENT SIMULATIONS

(75) Inventors: Karthikeyan Chandrashekar, Bethesda, MD (US); Paul M. Janes, Bethesda, MD (US); Alain J. Cohen, McLean, VA (US); Pradeep Singh, Arlington, VA (US); David James Boyd, Fulton, MD (US); Ibrahim Utku Moral, Gaithersburg, MD (US)

(73) Assignee: OPNET Technologies, Inc, Bethesda, MD (US)

( * ) Notice: Subject to any disclaimer, the term of this patent is extended or adjusted under 35 U.S.C. 154(b) by 501 days.

(21) Appl. No.: 11/875,900

(22) Filed: Oct. 20, 2007

(65) Prior Publication Data

US 2008/0103738 A1 May 1, 2008

Related U.S. Application Data

(60) Provisional application No. 60/863,212, filed on Oct. 27, 2006.

(51) Int. Cl.
*G06F 17/50* (2006.01)
*G06F 11/30* (2006.01)
*G06F 15/173* (2006.01)

(52) U.S. Cl. ............................... 703/2; 703/14; 703/22; 455/63.1; 455/500; 709/224

(58) Field of Classification Search ..................... 703/2, 703/14, 22, 17; 455/63.1, 500; 709/224
See application file for complete search history.

(56) References Cited

U.S. PATENT DOCUMENTS

| | | | | |
|---|---|---|---|---|
| 2005/0048964 | A1 | 3/2005 | Cohen et al. | |
| 2005/0055196 | A1 | 3/2005 | Cohen et al. | |
| 2006/0229090 | A1 * | 10/2006 | LaDue | 455/507 |
| 2007/0036088 | A1 | 2/2007 | Singh et al. | |

OTHER PUBLICATIONS

Liu, Ke; "Understanding the Implementation of IEEE MAC 802.11 Standard in NS2" (Online); May 3, 2006.

Weigle, M.; "ns-2/mac/mac-802_11.cc" (online); Jan. 30, 2006; XP002481983.

* cited by examiner

*Primary Examiner*—Thai Phan
(74) *Attorney, Agent, or Firm*—R. M. McDermott, Esq.

(57) ABSTRACT

Channel access delays and reception uncertainty are modeled as protocol-independent generic processes that are optimized for improved simulation performance. The generic process components are designed such that each different protocol can be modeled using an arrangement of these components that is specific to the protocol. In this way, speed and/or accuracy improvements to the generic process components are reflected in each of such protocol models. If an accurate analytic model is not available for the generic process component, a prediction engine, such as a neural network, is preferably used. The prediction engine is trained using the existing detailed models of network devices. Once trained, the prediction engine is used to model the generic process, and the protocol model that includes the generic component is used in lieu of the detailed models, thereby saving substantial processing time.

25 Claims, 2 Drawing Sheets

COMPONENT-BASED MODELING OF WIRELESS MAC PROTOCOLS FOR EFFICIENT SIMULATIONS

This application claims the benefit of U.S. Provisional Patent Application 60/863,212, filed 27 Oct. 2006.

BACKGROUND AND SUMMARY OF THE INVENTION

This invention relates to the field of simulation systems, and in particular to a network simulator that includes models of wireless nodes or other forms of broadcast communications.

A network simulator is an analysis tool that provides information that is useful for network planning and evaluation. New or existing networks can be analyzed to determine network performance, identify communication bottlenecks, estimate throughput capacity, and so on. Proposed changes to networks can be evaluated via simulation before they are implemented, so that informed choices can be made among considered alternatives.

The simulation of a complex network consumes a substantial amount of computer resources. In a conventional network simulation, the transmission of a packet of information is simulated by the propagation of "events" from one node/element in the network to another. The generation of the packet at the source node is an event that is propagated to the first node along the communication path of this simulated packet. The arrival of this packet at the first node is an event that triggers the modeling of the propagation of this event through the first node, resulting in the generation of a subsequent transmission event from this node and a reception event at the next node along the communication path. This reception event triggers the modeling of the propagation of the event through the second node, and the subsequent transmission-reception events to the next node, and so on.

To accurately model the performance of a network, the propagation of events at each node in the network should represent the actual performance of the device(s) at the node. That is, for example, the propagation of a packet through a router should include receipt of the packet into a receive queue, decoding of the destination address, routing the packet to the appropriate output port, queuing the packet in the output queue, and so on. Additionally, different protocols use different processes and procedures for managing access to the communication channel, handling errors and retransmissions, and so on.

Prior attempts to reduce the time required to perform simulation have generally included the use of analytical models in lieu of the detailed modeling of the actual network devices. These analytic models are generally custom designed for a particular protocol, using simplified assumptions regarding the operating conditions, the environment, or the device model. Such simplified models, however, are often not sufficiently accurate for the desired level of network analysis. Some analytical models have been found to be sufficiently accurate, but to achieve this accuracy, the models are highly customized for the particular protocol.

When accurate simulation of wireless network performance is required, the device models are complex and difficult to parameterize, because the number of factors that can affect the communication of messages in a wireless network are substantially greater than those that might affect a similarly structured wired network. Complex models provide more fidelity in the results, at the cost of slowing simulation performance. To obtain accuracy and fidelity in wireless simulations, all or most aspects of medium access and radio characteristics must be modeled. Conventional techniques include detailed discrete event simulation where interaction among the elements at the medium access (MAC) layer and the physical layer is modeled as event interactions for all elements affected by a transmission. Because the wireless medium is a shared medium, the complexity of modeling such interactions increases significantly when the size of the network increases.

The modeling of wireless communications is further complicated by the random nature of the transmission channel, the susceptibility to interference, the receiver range dependency, and other factors. Additionally, each wireless protocol generally deals with channel access, reception verification, and retransmissions differently, requiring the development of a variety of complex models to support these various protocols. Each of these different models must also be tested to assure an accurate emulation of the performance of actual devices in a variety of environments, and each model must be maintained to support subsequent changes and enhancements to the modeled devices and protocols, including potential enhancements to the underlying modeling technique.

It would be advantageous to provide a simulation modeling technique for wireless devices that substantially reduces the time required to accurately model network devices. It would be particularly advantageous to reduce the time required to develop, test, and maintain accurate models of wireless devices. It would also be advantageous to provide a modeling architecture for the development of models suitable for use with all, or most, communication protocols within a given communication technology.

These advantages, and others, can be realized by a simulation system and method that distinguishes generic communication phenomenon and processes from protocol specific processes, and optimizing the modeling of the generic processes. The generic process components are designed such that each different protocol can be modeled using a particular arrangement of these components that is specific to the protocol. In this way, speed and/or accuracy improvements to the generic process components are reflected in each of such protocol models. If an accurate analytic model is not available for the generic process component, a prediction engine, such as a neural network, is preferably used. The prediction engine is trained using the existing detailed models of network devices. Once trained, the prediction engine is used to model the generic process, and the protocol model that includes the generic component is used in lieu of the detailed models, thereby saving substantial processing time. Assuming a proper identification of input and output parameters, the accuracy of the prediction engine is generally limited only by the quality and quantity of training.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions. The drawings are included for illustrative purposes and are not intended to limit the scope of the invention.

DETAILED DESCRIPTION

Figure 1:
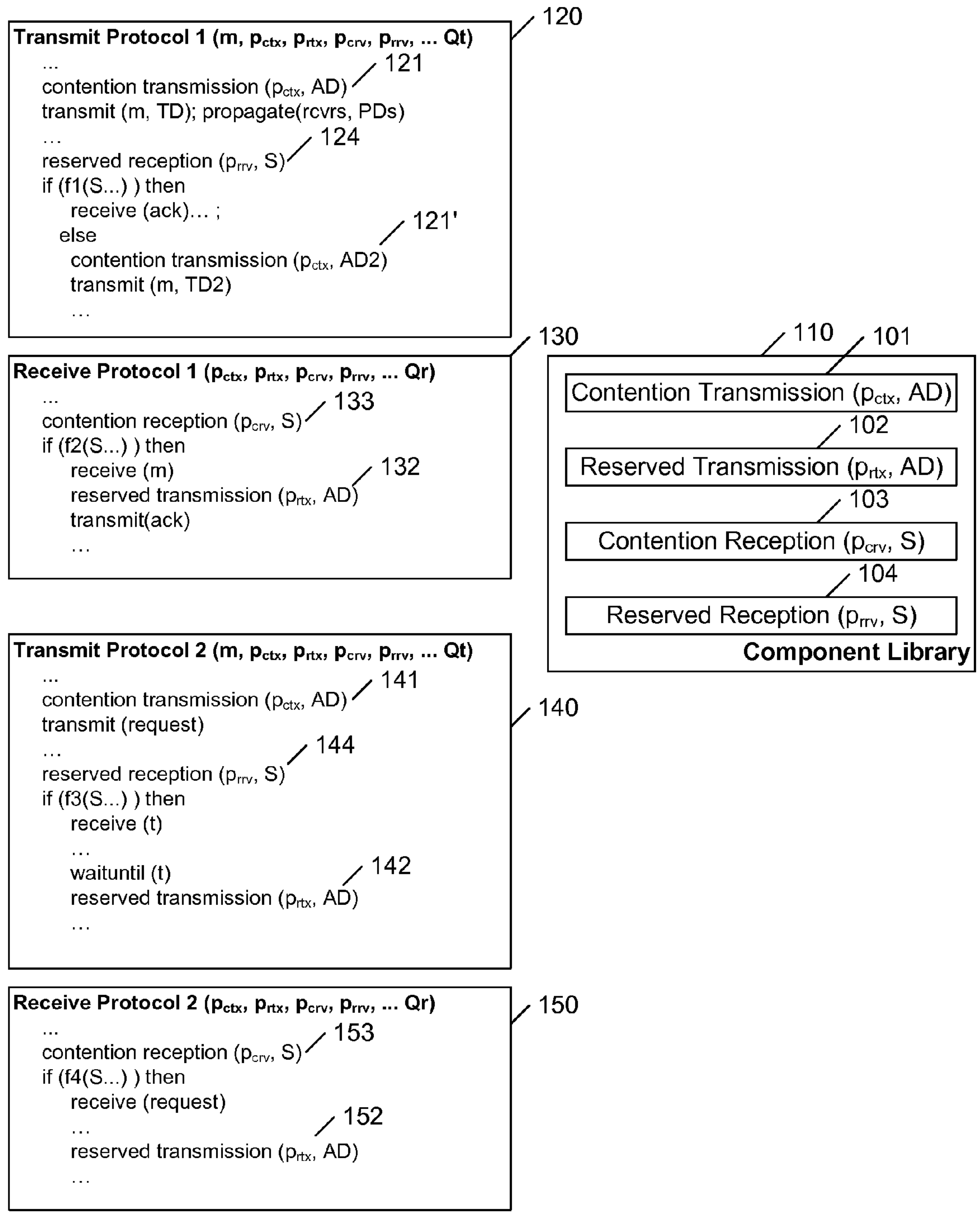
FIG. 1 illustrates an example set of generic process components for estimating channel access delay and reception uncertainty, and an example set of MAC protocols that use these components.

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

For the purposes of this disclosure, a model of a communication protocol includes the modeling of both the transmission and reception processes encompassed by the particular protocol. The protocol model will generally be embodied by distinct transmission and reception models which may or may not be grouped together as a single protocol model, per se. Also, for ease of presentation and understanding, the nomenclature provided by the OSI (Open Systems Interconnection) standards is used, specifically the term MAC (media access control) is used to identify the protocol layer that this invention addresses. One of skill in the art will recognize, however, that the principles provided herein are not limited to OSI compliant devices, and can be applied to the modeling of any protocol that addresses wireless communications among devices.

The inventors have recognized that although wireless MAC protocols may generally be classified as either a contention-based or a reservation-based protocol, most MAC protocols include a combination of contention transmissions and reserved transmissions, regardless of the overall classification of the protocol. For example, in a reservation-based protocol, requests for reservations are often communicated on a contention basis. In like manner, in a contention-based protocol, receipt acknowledgements are often communicated in a reserved time slot.

The inventors have further recognized that the particular mix of contention-based transmissions and reserved transmissions generally distinguishes one protocol from another. Because both the transmission and reception characteristics are significantly dependent upon whether the channel is reserved for the particular transmission or not, different mixes of contention-based and reservation-based communications will provide different overall performance characteristics, and thus particular protocols are preferred for particular environments.

Alternatively stated, most, and perhaps all, protocols can be defined by a specific mix of contention-based and reservation-based communications, and each of these communications include contention-based and reservation-based transmissions and receptions. Protocols are also distinguished by the actions taken after each of these communications, or attempted communications. Further, the inventors have recognized that, generally, the most complex modeling tasks for wireless MAC transmissions and receptions is the modeling of channel access delay at the transmitter, and the modeling of the probabilistic nature of successful receptions, and each of these modeling functions is strongly dependent upon whether the transmission is contention-based or reserved-based. The other modeling tasks associated with the actual message transmission are generally straightforward, such as the modeling of transmission delay based on the size of the message and the transmission bit-rate, or the modeling of propagation delay based on the distance of each receiver from the transmitting device.

Using this paradigm to describe protocols, each protocol can be defined in terms of a sequence of the following generic processes, with other processes interspersed within the sequence:

- a contention transmission process that models transmit channel access,
- a reserved transmission process that models transmit channel access,
- a contention reception process that models reception uncertainty, and
- a reserved reception process that models reception uncertainty.

In accordance with an aspect of this invention, the above four processes are defined independent of any particular protocol, so that they form 'generic' process components that can be embodied in any MAC protocol model. In this manner, the complexities of wireless channel access and reception uncertainties are contained in these generic process components, while the protocol-specific sequences and actions are contained in the upper-level protocol models that selectively invoke these processes. As noted above, these processes are generally the most complex and/or most difficult to accurately model. By providing an architecture wherein each MAC protocol model is able to use these generic process components, development efforts to improve the speed and/or accuracy of these components will provide such gains to each of the MAC protocol models that use these components.

FIG. 1 illustrates an example use of these generic process components. Each of the components are configured to receive parameters of the process that are particular to the device being modeled. The transmission components 101 and 102 are each configured to return a determined or estimated access delay AD corresponding to these parameters to the device being modeled, and the receive components 103 and 104 are each configured to return a determined or estimated likelihood of successful reception S. Hereinafter, the terms 'determined' and 'estimated' are used synonymously, in that the process component determines a particular value, and this value is an estimate of a characteristic exhibited by the system being simulated.

Figure 2:
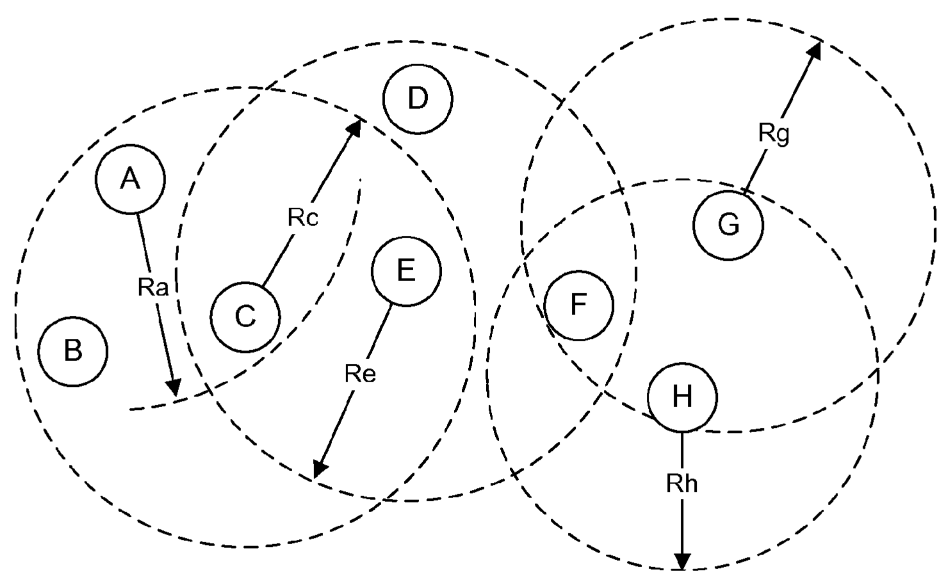
FIG. 2 illustrates an example wireless network.

FIG. 2 illustrates an example wireless network environment comprising a plurality of wireless nodes A-H, some of which may be mobile, and some stationary at a fixed location. Each node exhibits a certain transmission range Ri, which is primarily determined by the characteristics of its transmitter, such as power, antenna gain, and so on. In FIG. 2, for example, the transmission range Re of node E includes nodes C, D, and F; the transmission range Rg of node G includes nodes F and H; etc.

When node E has a message to transmit, it must contend with the possibility that nodes D, C, or F may also have messages to transmit. Similarly, nodes D, C, and F, must contend with the possibility that node E has a message to transmit. In a typical contention-based system, a transmitter is configured to wait a random amount of time before attempting to start a transmission, then "back off" if another transmitter is already transmitting. This delay-and-back-off process consumes time that could have been spent transmitting the message if the contention were not present. As the number of contenders increase, the amount of time spent dealing with the contentions before access is gained generally increases exponentially.

A contention transmission component 101 is configured to determine the channel access delay AD based on a set of parameters $p_{ctx}$ that are considered relevant to access to a contention-based transmission channel. In a preferred embodiment, these parameters include:

the number of one-hop active nodes, relative to the particular transmitter;

statistics regarding packet size and packet arrivals, relative to the contending transmitters; and statistics regarding channel attempts.

The term 'statistics' is used in the general sense, meaning one or more measures that serve to characterize the particular parameter or phenomenon. The term 'one-hop' active-node is used to define a remote/contending transmitter that can reach the instant transmitter directly and has at least one packet to transmit in its queue; that is, in a typical contention-based network, a one-hop active node is a contending transmitter whose transmission will cause the instant transmitter to back-off. When the instant transmitter backs-off, it cannot re-attempt to access the channel until the contending transmitter completes its transmission, and this completion is dependent upon the size of the packet being transmitted, and upon whether subsequent packets are contiguously transmitted from the contending transmitter. Additionally, in most contention based protocols, the back-off period is set to a value that generally increases with each retransmission attempt, increasing the likelihood of resolving the contention among nodes, at the cost of increased overall access time.

Other parameters may be included, depending upon the model used, but the above have been found to be particularly effective for providing an accurate and consistent estimate of channel access delay time in a contention-based transmission channel. In a rate adaptive system, for example, wherein the transmission data rate is adjusted based on signal distortion, an input parameter to the model would be statistics relative to signal distortion. One of skill in the art will also recognize that other outputs may also be provided, in this component and the other components 102-104 of FIG. 1, such as error indicators and the like that may be required for reliable operation of the simulation process, as is common in the art.

In a reserved-based transmission channel, a transmitter that has a message to transmit is provided one or more reserved time-slots within which to transmit. Each of the other transmitters is aware of the reservations and is configured to avoid transmissions during periods reserved for other transmitters. In this manner, the above delay-and-back-off process is avoided, and the access delay is primarily dependent upon how long the transmitter must wait before its allocated time-slot(s) arrive.

A reserved transmission component 102 is configured to determine the channel access delay AD based on a set of parameters $p_{rtx}$ that are considered relevant to access to a reserved-based transmission channel. In a preferred embodiment, these parameters include:

the number of one-hop active nodes, relative to the particular transmitter;

statistics regarding message queue relative to the particular transmitter; and statistics regarding message queue relative to the contending transmitters.

As the number of transmitters requesting allocation of time-slots increases, the time until an allocated time-slot arrives will increase. In like manner, this delay time will increase if the transmitters are requesting multiple time-slots, or long-duration time-slots.

Other parameters may be included, depending upon the model used, but the above have been found to be particularly effective for providing an accurate and consistent estimate of channel access delay time in a reserved-based transmission channel.

The likelihood of successful reception will also be dependent upon whether the channel is contention-based or reserved-based. Referring again to FIG. 2, node C is within range of both nodes A and E; however, nodes A and E are out of range of each other. Therefore, in a contention-based channel, node A will not detect transmissions from node E, and will not back-off while node E is transmitting. If node C is in the process of receiving a message from node E, a transmission from node A on the same channel will interfere with this reception, likely causing the reception to fail. In a reserved-based channel, on the other hand, the reservations are generally communicated to all participating nodes, and/or nodes are prohibited from transmitting in the channel until expressly granted an allocated time-slot. In the prior example, if nodes A through F are participating nodes, node A will not transmit during node E's allocated time-slot, regardless of whether node A can detect node E's transmissions. On the other hand, if nodes G and H are not participating, their transmissions will interfere with node F's reception. Generally, all nodes in range of each other are required to become participating nodes on a reserved-based channel; therefore, interference generally only occurs when nodes beyond the range of nodes on the reserved-based channel initially come into range.

A contention reception component 103 is configured to determine the likelihood of a successful reception S based on a set of parameters $p_{crv}$ that are considered relevant to reception in a contention-based transmission channel. In a preferred embodiment, these parameters include:

the number of one-hop active nodes, relative to the particular receiver;

statistics regarding packet size and packet arrivals, relative to the contending transmitters; and statistics regarding signal distortion.

In addition to the likelihood of neighboring transmitters interfering with each other, as discussed above, the likelihood of a successful reception of an entire packet will be dependent upon the length of the packet, as well as the amount of distortion introduced by the particular environment.

A reserved reception component 104 is configured to determine the likelihood of a successful reception S based on a set of parameters $p_{rrv}$ that are considered relevant to reception in a reserved-based transmission channel. In a preferred embodiment, these parameters include:

the number of non-participating non-one-hop active nodes, relative to the particular receiver; and statistics regarding signal distortion.

As noted above, the likelihood of an successful transmission is dependent upon the likelihood of an active non-participating transmitter entering within range of the receiver. Although this likelihood will be dependent upon how close each non-participating transmitter is to the range of the receiver, it has been found that the number of non-participating non-one-hop active nodes relative to the receiver, independent of distance from the receiver, exhibits a strong correlation with the likelihood of a successful reception, and is substantially easier to determine. Optionally, the distance between nodes can be used as an additional input, or the network can be partitioned into different geographic regions, and the number of non-participating non-one-hop active nodes is limited to the nodes within a given region.

As in the transmission components, other parameters may be included in each of these reception components, depending upon the model used, but the above have been found to be particularly effective for providing an accurate and consistent estimate of the likelihood of successful reception for each channel type.

Each of these components 101-104 are provided in a component library 110, for use by any of the MAC protocol models provided in the network simulation system. Excerpts of two example MAC protocol models are provided in FIG. 1. The first MAC protocol includes a transmit protocol 120 and a receive protocol 130; the second MAC protocol includes a transmit protocol 140 and a receive protocol 150.

Each transmit protocol 120, 140 is illustrated as receiving a message m to be transmitted, and parameters $p_{ctx}$, $p_{rtx}$, $p_{crv}$, $p_{rrv}$ that characterize the transmitting device and the environment being simulated, and providing a set of outputs Qt corresponding to the simulated transmission of the message m in this environment. Other input parameters, such as transmit power and the like will also generally be provided, as is common in the art of network simulation. The set of outputs Qt will include such parameters as the transmit time of the message, whether the message was acknowledged, and so on, also common in the art of network simulation.

Each receive protocol 130, 150 is illustrated as receiving parameters $p_{ctx}$, $p_{rtx}$, $p_{crv}$, $p_{rrv}$ that characterize the receiving device and the environment being simulated, and providing a set of outputs Qr corresponding to the simulated reception of the message m in this environment. The set of outputs Qr will include such parameters as the message received, the time of reception, and so on, common in the art of network simulation.

The first transmit protocol 120 is representative of a typical contention-based protocol model, such as an 802.11b MAC model. After some initial processing, the transmitting device will attempt to access the transmission channel, which is modeled by an invocation 121 of the above described contention transmission process component 101, which will determine the channel access delay time AD incurred for the particular transmission being simulated.

After the channel is accessed, the transmission of the current message m commences, which is modeled, for example, by another component "transmit (m, TD)" in 120, which will determine the transmission delay time TD for this particular message. Another example component "propagate (rcvrs, PDs)" is illustrated, which will determine the propagation delay time PDs between the transmitter and the receivers rcvrs within range of the transmitter. Other components will similarly be invoked to model the operation of the particular device in accordance with the given protocol, as is common in the art of network simulation.

At some point during the process, the example protocol calls for receipt of an acknowledgement signal. The modeling of this part of the protocol process includes determining whether a successful reception has occurred. In this example, acknowledgements are received on a reserved-based channel, and is modeled via an invocation 124 of the reserved reception process component 104, which will determine the likelihood of successful reception S for the particular transmission being simulated.

The resultant likelihood S is then used to model alternative behaviors within the protocol, as illustrated by the conditional "if ((f1(S) . . . )", where f1 is a function that returns, for example, a true or false result depending upon the value of S. In a simple embodiment, a randomly generated variable between 0 and 1 is compared to S at each call, thereby simulating random failures based on the value of S.

If a successful reception is detected, the acknowledgement is received, and the process continues. If not, a retransmission is attempted, which is modeled as another invocation 121' of the contention transmission process component 101 to determine another channel access delay time AD2, followed by the retransmission of the message ("transmit(m, TD2)") and subsequent processes according to the given protocol.

Excerpts of the corresponding receive protocol 130 are illustrated, corresponding to the process that is invoked at the potential receiver(s) of the above example transmitted message. As noted above, the message is transmitted via a contention-based channel, and therefore the receiver model invokes 133 the contention reception process component 103 to determine a likelihood S of receiving the transmitted message.

If a successful reception ("If(f2(S) . . . )") is detected, the message m is received, and the receiver initiates a process to communicate an acknowledgement to the transmitter. As noted above, in this example, acknowledgements are communicated via a reserved-based channel, and therefore is modeled using an invocation 132 of the reserved transmission process component 102 to determine the access delay AD, followed by the transmission of the acknowledgement and subsequent processes of the given protocol.

As can be seen, by providing the generic models 101-104, the complexities of wireless channel access and uncertain reception are removed from the transmit and receive models 120-130 for this protocol. The advantages of this architecture become apparent by considering the excerpts of the transmit and receive protocols 140-150 for the second protocol.

The second protocol is an example of a typical reservation based protocol, such as the RTS/CTS (request-to-send/clear-to-send) mode of 802.11b. In this example protocol, when the transmitter has a message m to transmit, it must request a reservation via a contention-based transmission channel, or during a reserved contention period on the reservation-based transmission channel, which is modeled as an invocation 141 of the contention transmission process component 101 followed by the transmission of the request.

The controlling station, using the receive protocol 150, receives the request on the contention-based channel, as modeled by the invocation 153 of the contention reception process component 103, followed by the receipt of the request. After some processing, the controlling station allocates a time-slot and transmits 152 the time via a reserved channel. The transmitter receives the allocated time 144, then transmits 142 the message on the reserved-based channel at the allocated time.

As can be seen, this second protocol is also free of the complexities of wireless channel access and probabilistic reception via the use of the generic components 101-104. Of particular note, the same protocol-independent generic components 101-104 are used by both models, thereby reducing overall development and support costs. And, as noted above, improvements to the components 101-104 will be realized by each of the protocol models 120-130 and 140-150. As additional protocol models are created using these generic models 101-104, the advantages of this invention are realized by each.

Preferably, the generic models 101-104 are analytic models, to avoid the long processing times generally experienced during simulations of large networks with discretely modeled processes and phenomena. If analytic models are not available, or are not sufficiently accurate, savings in processing time can be achieved using estimation engines for some or all of these generic components. A generic neural network model is an example of a prediction engine that can be used as a function approximation tool to model each of the functional components.

Data for training the neural networks is obtained by executing detailed packet level simulations of the wireless networks using the existing MAC protocol models. The training set consists of the input parameters for the functional components described above and the observed access delay and reception success outputs. The trained neural networks are then used as function approximations within packet level simulations to determine the channel access delay or the packet reception outcome.

The use of neural networks to replace complex simulation models is well known in the art, as is the training of such networks via simulations using such complex simulation models. However, in this invention, because the generic process components 101-104 are specifically designed to be protocol-independent, the training of the neural network components using an existing complex model of a particular protocol will serve to provide the generic components 101-104 for use in other protocols, and particularly in protocols for which an accurate model does not yet exist.

Figure 3A:
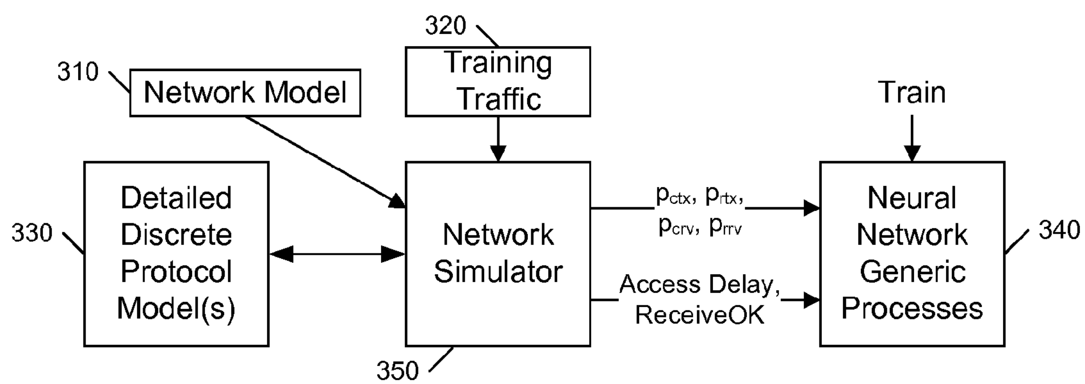
FIGS. 3A and 3B illustrate the training and use, respectively, of prediction engines in a network simulator.
Figure 3B:
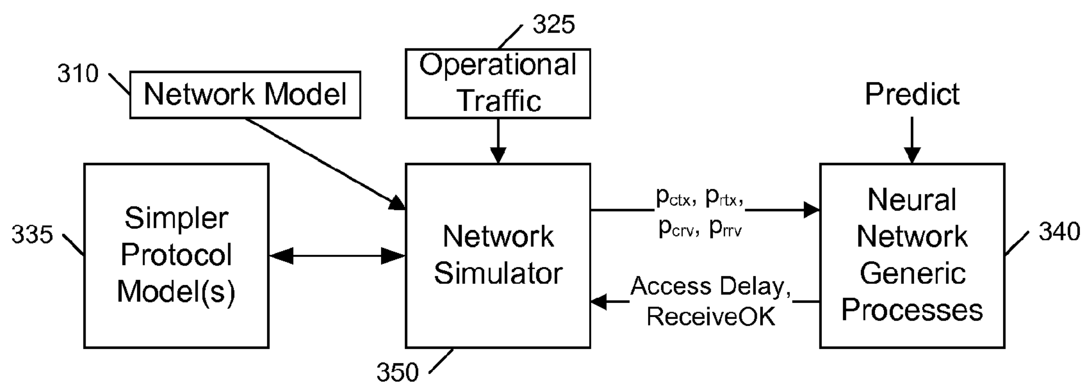

FIGS. 3A and 3B illustrate the training and use of a trainable prediction engine in a simulation of a network that includes wireless communications.

FIG. 3A illustrates the training of an example set of neural network generic processes 340. In this example, a network 310 that includes wireless channels is simulated using device models 330 that use conventional discrete models of processes and phenonema associated with wireless communications and protocols. In a preferred embodiment, the simulator 350 is configured to provide the values of select parameters to the trainable generic processes 340 while in a training mode. In a preferred embodiment, the neural networks receive the values of the aforementioned input parameters $p_{ctx}$, $p_{rtx}$, $p_{crv}$, $p_{rrv}$ to each of the generic processes, as well as the resultant channel access delay AD experienced by each modeled transmitter, and an indicator ReceiveOK that indicates whether each transmitted packet is successfully received at each modeled receiver.

As noted above, highly detailed and accurate wireless transmission and reception models are common in the art of network simulation, as is the concept of training prediction engines by exercising the detailed models 330 with training patterns 320. As is also known in the art, the success of the training in terms of the ability of the prediction engine 340 to subsequently provide the same output as the detailed model is primarily dependent upon the correlation between the values of the input parameters and the resultant values of the output parameters. Given a sufficient set of training traffic and an appropriate selection of correlated input and output parameters, trained prediction engines are able to provide outputs that are very similar to the outputs of the more complex models given the same inputs while consuming substantially less processing resources.

After the generic processes 340 are suitably trained, substantially simpler protocol models 335 that are configured to use the generic processes 340 can be used in lieu of the detailed discrete protocol models 330 that are currently and consistently used for modeling wireless communication protocols, as illustrated in FIG. 3B. Although FIG. 3B illustrates the use of the generic processes 340 for simulating the same network model 310, these trained processes 340 can also be used in the simulation of other networks as well. In like manner, these trained generic processes 340 can be used in models of other MAC layer devices and other protocols.

Although this disclosure is presented in the context of developing a single set of four generic processes 340, one of skill in the art will realize that multiple sets and partial sets may also be developed. For example, different aspects of the environments may result in different MAC access and/or reception characteristics. Rather than developing prediction engines that include these aspects of the environment as input parameters to the generic process, different versions of the prediction engine can be developed for the different environments, thereby simplifying the training process by using substantially simpler prediction engines.

One of skill in the art will recognize that the principles of this invention can be used in conjunction with other techniques that are used to model wireless communications. For example, this invention may be used in conjunction with the principles disclosed in U.S. patent application Ser. No. 10/923,214, "WIRELESS HYBRID SIMULATION filed 20 Aug. 2004 for Cohen et al., and/or the principles disclosed in U.S. patent application Ser. No. 10/821,558, "WIRELESS LINK SIMULATION WITH GENERIC CACHING" filed 9 Apr. 2004 for Cohen et al., and/or U.S. patent application Ser. No. 11/501,388, "WIRELESS MAC AND LINK-LAYER SIMULATION MODELING", filed 9 Aug. 2006 for Singh et al., each of which are incorporated by reference herein.

The foregoing merely illustrates the principles of the invention. It will thus be appreciated that those skilled in the art will be able to devise various arrangements which, although not explicitly described or shown herein, embody the principles of the invention and are thus within its spirit and scope. For example, although the training of the generic process components 340 is presented in FIG. 3A as a separate process from the simulation of the network with operational traffic 325 as presented in FIG. 3B, the processes of FIGS. 3A and 3B need not be distinct. An embodiment of this feature of the invention, for example, can include the simulation of the network 310 using the detailed models 330 for an initial period of the operational simulation, and then, when the neural network is determined to be adequately trained, the simpler protocol models 335 that use these trained components can be used in lieu of the detailed models 330 for the remainder of the simulation. Consistent with the aforementioned use of multiple versions of a prediction engine for different environments, the training of the neural nets using operational traffic can be simplified by partitioning the network into geographic regions and training individual neural networks for each region. In like manner, in priority-based shared media systems, such as a QoS (Quality of Service) based protocol, where different queues are maintained for different priority levels, and higher priority queues can preempt lower priority queues, multiple versions of a prediction engine can be trained for each priority level, instead of training a general model that includes priority as an input parameter. These and other system configuration and optimization features will be evident to one of ordinary skill in the art in view of this disclosure, and are included within the scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts is intended to be required unless specifically indicated; and i) the term "plurality of" an element includes two or more of the claimed element, and does not imply any particular range of number of elements; that is, a plurality of elements can be as few as two elements, and can include an immeasurable number of elements.

We claim:

1. A network simulator comprising:

a set of components including:

a contention transmission component, a reserved transmission component, a contention reception component, and a reserved reception component, a plurality of device models including at least a first and second wireless MAC model, a controller that is configured to control propagation of simulated traffic events in a network among at least some of the plurality of device models, wherein:

the first wireless model includes the set of components arranged in a first protocol configuration, and the second wireless model includes the set of components arranged in a second protocol configuration that differs from the first protocol configuration.

2. The network simulator of claim 1, wherein one or more of the components of the set of components includes a prediction engine.

3. The network simulator of claim 2, wherein the prediction engine includes a neural net.

4. The network simulator of claim 1, wherein each of the contention and reserved transmission components is configured to provide an estimated channel access delay.

5. The network simulator of claim 1, wherein the contention transmission component is configured to provide an estimated channel access delay, based upon:

a number of one-hop active nodes, at least one packet size parameter, at least one packet arrival parameter, and at least one channel attempt parameter.

6. The network simulator of claim 1, wherein the reserved transmission component is configured to provide an estimated channel access delay, based upon:

a number of one-hop active nodes, at least one transmitting node queue parameter, and at least one one-hop active node queue parameter.

7. The network simulator of claim 1, wherein each of the contention and reserved reception components is configured to determine whether a transmitted packet is received successfully.

8. The network simulator of claim 1, wherein the contention reception component is configured to determine whether a transmitted packet is received, based upon:

a number of one-hop active nodes, at least one packet size parameter, at least one packet arrival parameter, and at least one signal distortion parameter.

9. The network simulator of claim 1, wherein the reserved reception component is configured to determine whether a transmitted packet is received, based upon:

a number of non-participating non-one-hop active nodes, and at least one signal distortion parameter.

10. The network simulator of claim 1, wherein the controller is configured to train one or more components of the set of components based on a simulation of a third wireless MAC model that does not include the one or more components.

11. The network simulator of claim 10, wherein the controller is configured to terminate the training of the one or more components and continue the simulation using the first MAC model.

12. The network simulator of claim 10, wherein the controller is configured to train a plurality of variants of at least one component of the set of components, each variant corresponding to a particular region of the network.

13. A method of simulating a network, comprising:

propagating, on a network simulation machine, simulated traffic events among a plurality of device models that include at least a first and second wireless MAC model, wherein the propagating of the simulated traffic events at the first wireless MAC model includes executing a first sequence of transmissions and receptions, the propagating of the simulated traffic events at the second wireless MAC model includes executing a second sequence of transmissions and receptions that differs significantly from the first sequence, and, the method includes:

executing, on the network simulation machine, a common channel access process model to determine a first channel access delay for a transmission of the first sequence of transmissions, executing, on the network simulation machine, the common channel access process model to determine a second channel access delay for a transmission of the second sequence of transmissions, executing, on the network simulation machine, a common channel reception process model to determine a first likelihood of successful reception for a reception of the first sequence of receptions, and executing, on the network simulation machine, the common channel reception process model to determine a second likelihood of successful reception for a reception of the second sequence of receptions.

14. The method of claim 13, wherein the common channel access process model includes a contention transmission component and a reserved transmission component.

15. The method of claim 14, wherein the common channel reception process model includes a contention reception component and a reserved reception component.

16. The method of claim 13, wherein the common channel reception process model includes a contention reception component and a reserved reception component.

17. The method of claim 13, wherein the common channel access process model is embodied as one or more neural nets.

18. The method of claim 13, wherein the common channel reception process model is embodied as one or more neural nets.

19. The method of claim 13, including training at least one model of the common channel access process model and the common access reception process model based on a simulation of a third wireless MAC model that does not include the at least one model.

20. The method of claim 19, including:

terminating the training, and continuing the simulation using the first MAC model.

21. The method of claim 19, including training a plurality of variants of the at least one model.

22. A non-transient computer readable medium that includes a computer program that is configured to cause a processor to simulate a network, the computer program including program code that includes:

a set of components including:

a contention transmission component, a reserved transmission component, a contention reception component, and a reserved reception component, a plurality of device models including at least a first and second wireless MAC model, wherein:

the first wireless model includes code corresponding to a first protocol that executes components of the set of components in a first predefined sequence, and the second wireless model includes code corresponding to a second protocol that executes components of the set of components in a second predefined sequence that differs from the first predefined sequence.

23. The computer readable medium of claim 22, wherein one or more of the components of the set of components is encoded as a neural net.

24. The computer readable medium of claim 22, wherein the program code includes a training module that is configured to train at least one component of the set of components based on a simulation of the network using at least a third wireless MAC model that does not execute the at least one component.

25. The computer readable medium of claim 22, wherein the training module is configured to train a plurality of variants of the at least one component, each variant corresponding to a particular region of the network.

* * * * *